US006859804B2

(12) United States Patent
Kamath et al.

(10) Patent No.: US 6,859,804 B2
(45) Date of Patent: Feb. 22, 2005

(54) USING HISTOGRAMS TO INTRODUCE RANDOMIZATION IN THE GENERATION OF ENSEMBLES OF DECISION TREES

(75) Inventors: Chandrika Kamath, Tracy, CA (US); Erick Cantu-Paz, Oakland, CA (US); David Littau, Minneapolis, MN (US)

(73) Assignee: The Regents of the University of California, Oakland, CA (US)

( * ) Notice: Subject to any disclaimer, the term of this patent is extended or adjusted under 35 U.S.C. 154(b) by 430 days.

(21) Appl. No.: 10/167,844

(22) Filed: Jun. 11, 2002

(65) Prior Publication Data

US 2003/0229641 A1 Dec. 11, 2003

(51) Int. Cl.[7] .............................................. G06F 17/30
(52) U.S. Cl. .......................................................... 707/6
(58) Field of Search .............................................. 707/6

(56) References Cited

U.S. PATENT DOCUMENTS

| 5,047,842 | A | * | 9/1991 | Bouman et al. ............ 358/515 |
|---|---|---|---|---|
| 5,787,274 | A | * | 7/1998 | Agrawal et al. ............ 707/102 |
| 5,787,425 | A | | 7/1998 | Bigus |
| 5,799,311 | A | * | 8/1998 | Agrawal et al. ............ 707/102 |
| 5,899,992 | A | * | 5/1999 | Iyer et al. ...................... 707/7 |
| 6,055,539 | A | * | 4/2000 | Singh et al. ................. 707/102 |
| 6,675,164 | B2 | * | 1/2004 | Kamath et al. .................. 707/6 |
| 6,750,864 | B1 | * | 6/2004 | Anwar ......................... 345/440 |
| 2003/0061213 | A1 | * | 3/2003 | Yu et al. .......................... 707/7 |
| 2003/0061228 | A1 | * | 3/2003 | Kamath et al. ............... 707/102 |
| 2003/0065535 | A1 | * | 4/2003 | Karlov et al. ................... 705/2 |

OTHER PUBLICATIONS

Wang et al, CMP: A Fast Decision Tree Classifier Using Multivariate Predictions, PROC 16th Intl Conf on Data Engineering, San Diego, CA Feb. 28–Mar., 3, 2000, pp449–460.*

Baur, E.,et al., "An Empirical Comparison of Voting Classification Algorithms: Bagging, Boosting, and Variants," Machine Learning, 36, (1999), pp. 105–142, Kluwer Academic Publishers, Boston.

Dietterich, T., "An Experimental Comparison of Three Methods for Constructing Ensembles of Decision Trees: Bagging, Boosting, and Randomization," Machine Learning, (1998) pp. 1–22, Kluwer Academic Publishers, Boston.

Dietterich, T., "An Experimental Comparison of Three Methods for Constructing Ensembles of Decision Trees: Bagging, Boosting, and Randomization," Machine Learning, (1999) pp. 1–22, Kluwer Academic Publishers, Boston.

Kamath, C., et al., "Approximate Splitting for Ensembles of Trees Using Histograms," Lawrence Livermore National Laboratory, Preprint UCRL–JC–145576, Oct. 1, 2001, 18 pages.

(List continued on next page.)

Primary Examiner—Wayne Amsbury
(74) Attorney, Agent, or Firm—Eddie E. Scott; Alan H. Thompson

(57) ABSTRACT

A system for decision tree ensembles that includes a module to read the data, a module to create a histogram, a module to evaluate a potential split according to some criterion using the histogram, a module to select a split point randomly in an interval around the best split, a module to split the data, and a module to combine multiple decision trees in ensembles. The decision tree method includes the steps of reading the data; creating a histogram; evaluating a potential split according to some criterion using the histogram, selecting a split point randomly in an interval around the best split, splitting the data, and combining multiple decision trees in ensembles.

45 Claims, 4 Drawing Sheets

OTHER PUBLICATIONS

Kamath, C, et al., "Classification of Bent–Double Galazies: Experiences with Ensembles of Decision Trees," Lawrence Livermore National Laboratory, Feb. 22, 2002, pp. 1–7.

Alsabti, K., et al., "CLOUDS: A Decision Tree Classifier for Large Datasets," Oct. 27, 1998, pp. 1–34.

Kamath, C., et al., "Creating ensembles of decision trees through sampling," Lawrence Livermore National Laboratory, Preprint UCRL–JC–142268–REV–1, Aug. 15, 2001.

Opitz, D., et al., "Popular Ensemble Methods: An Empirical Study," Journal of Artificial Intelligence Research 11, (1999) pp. 169–198, AI Access Foundation and Morgan Kaufmann Publishers.

Cantu–Paz, E., et al., "Using Evolutionary Algorithms to Induce Oblique Decision Trees," Lawrence Livermore National Laboratory, Preprint UCRL–JC–137202, Jan. 21, 2000.

* cited by examiner

USING HISTOGRAMS TO INTRODUCE RANDOMIZATION IN THE GENERATION OF ENSEMBLES OF DECISION TREES

CROSS REFERENCE TO RELATED APPLICATIONS

Related subject matter is disclosed and claimed in the following commonly owned, copending, U.S. patent applications; "PARALLEL OBJECT-ORIENTED DECISION TREE SYSTEM," by Chandrika Kamath and Erick Cantu-Paz, U.S. patent application Ser. No. 09/877,570, filed Jun. 8, 2001, "CREATING ENSEMBLES OF OBLIQUE DECISION TREES WITH EVOLUTIONARY ALGORITHMS AND SAMPLING," by Erick Cantu-Paz and Chandrika Kamath, U.S. patent application Ser. No. 10/133,992, filed Apr. 25, 2002, and "CREATING ENSEMBLES OF DECISION TREES THROUGH SAMPLING," by Chandrika Kamath and Erick Cantu-Paz, U.S. patent application Ser. No. 10/167,892, filed Jun. 11, 2002. The commonly owned, copending, U.S. Patent Applications identified above are incorporated herein by reference in their entirety.

The United States Government has rights in this invention pursuant to Contract No. W-7405-ENG-48 between the United States Department of Energy and the University of California for the operation of Lawrence Livermore National Laboratory.

BACKGROUND

1. Field of Endeavor

The present invention relates to classification systems and more particularly to decision trees.

2. State of Technology

U.S. Pat. No. 5,787,425 for an object-oriented data mining framework mechanism by Joseph Phillip Bigus, patented Jul. 28, 1998 provides the following description, "The development of the EDVAC computer system of 1948 is often cited as the beginning of the computer era. Since that time, computer systems have evolved into extremely sophisticated devices, capable of storing and processing vast amounts of data. As the amount of data stored on computer systems has increased, the ability to interpret and understand the information implicit in that data has diminished. In the past, data was stored in flat files, then hierarchical and network data base systems, and now in relational or object oriented databases. The primary method for analyzing that data has been to form well structured queries, for example using SQL (Structured Query Language), and then to perform simple aggregations or hypothesis testing against that data. Recently, a new technique called data mining has been developed, which allows a user to search large databases and to discover hidden patterns in that data. Data mining is thus the efficient discovery of valuable, non-obvious information from a large collection of data and centers on the automated discovery of new facts and underlying relationships in the data. The term "data mining" comes from the idea that the raw material is the business data, and the data mining algorithm is the excavator, shifting through the vast quantities of raw data looking for the valuable nuggets of business information. Because data can be stored in such a wide variety of formats and because the data values can have such a wide variety of meanings, data mining applications have in the past been written to perform specific data mining operations, and there has been little or no reuse of code between application programs. Thus, each data mining application is written from scratch, making the development process long and expensive. Although the nuggets of business information that a data mining application discovers can be quite valuable, they are of little use if they are expensive and untimely discovered. Returning to the mining analogy, even if gold is selling for $900 per ounce, nobody is interested in operating a gold mine if it takes two years and $901 per ounce to get it out of the ground."

The paper "Approximate Splitting for Ensembles of Trees Using Histograms," by Chandrika Kamath, Erick Cantu-Paz, and David Littau, presented at the 2-nd SIAM International Conference on Data Mining, Crystal City, Va., Apr. 11–13, 2002, indicates that decision trees ensembles are popular classification methods, and there are numerous algorithms to introduce randomization in a tree classifier using a given set of data. The randomization makes each tree in the ensemble different, and their results can be combined using voting to create more accurate classifiers. There are several different ways of introducing randomization in the generation of ensembles of decision trees. The most popular approaches, such as boosting and bagging, use sampling to introduce randomization. The Applicants' invention uses histograms to introduce randomization. The Applicants' invention uses histograms to introduce randomization in the classifier. The idea of using histograms to approximate the split at each node of the tree has been around a long time as a way of reducing the time to create a tree with a very large training set. Instead of sorting all the available data instances at each node and considering potential split points between all the attribute values, the histogram approach creates a histogram and uses the bin-boundaries as potential split points. Since there are fewer bin boundaries than data instances, the approach using histograms is faster than the approach using sorting. The best bin boundary, according to some splitting criterion, is chosen as the split point at that node of the decision tree. In the present invention, this use of histograms is extended further, and randomization is introduced at each node of the tree by considering an interval around the best bin-boundary and randomly selecting a point in this interval as the split point. This randomization makes each tree in the ensemble different and their results can be combined using voting to create more accurate classifiers. The resulting ensemble is competitive in accuracy and can be superior in computational cost to traditional approaches for creating ensembles based on boosting and bagging. The paper "Approximate Splitting for Ensembles of Trees Using Histograms," by Chandrika Kamath, Erick Cantu-Paz, and David Littau, presented at the 2-nd SIAM International Conference on Data Mining, Crystal City, Va., Apr. 11–13, 2002, is incorporated herein by this reference.

SUMMARY

Features and advantages of the present invention will become apparent from the following description. Applicants are providing this description, which includes drawings and examples of specific embodiments, to give a broad representation of the invention. Various changes and modifications within the spirit and scope of the invention will become apparent to those skilled in the art from this description and by practice of the invention. The scope of the invention is not intended to be limited to the particular forms disclosed and the invention covers all modifications, equivalents, and alternatives falling within the spirit and scope of the invention as defined by the claims.

The present invention provides a decision tree system that includes a module to read the data, a module to create a histogram of the data, a module to evaluate a potential split of the data according to some criterion, using the histogram, a module to select a split point randomly in an interval around the best split found using the histogram, a module to split the data, and a module to combine multiple decision trees in ensembles. In one embodiment the present invention includes a module to read the data, a module to create a histogram for the data, a module to evaluate a potential split of the data according to some criterion using the histogram bin boundaries, a module to select a split point randomly in an interval around the best bin boundary, a module to split the data, and a module to combine multiple decision trees in ensembles. One embodiment of the decision tree system includes a file and a main memory and the module to read the data, reads the data from the file to the main memory. In one embodiment, the module to read the data creates multiple decision trees. In one embodiment, the module to create the histogram uses fixed-width bins. In another embodiment, the module to create the histogram uses fixed-height bins. In one embodiment, the criterion used to evaluate the split is the Gini criterion. In another embodiment, the criterion used to evaluate the split is the information gain criterion. In one embodiment, the interval used for randomly selecting the split point is centered around the best bin boundary. In another embodiment, the interval is biased towards the bin with the larger number of instances. In one embodiment, the multiple trees in the ensemble are combined using simple majority voting. In another embodiment, the multiple trees in the ensemble are combined using weighted voting.

The decision tree method of the present invention is based on using an approximation at each node to create the tree and includes the steps of reading the data; creating a histogram for the data; evaluating a potential split according to some criterion using the bin boundaries of the histogram; selecting a split point randomly in an interval around the best bin boundary; splitting the data, and combining multiple decision trees in ensembles. The decision tree method includes a file and a main memory and the step of reading the data reads the data from the file to the main memory. In one embodiment, the step of creating a histogram uses equal width histograms. In another embodiment, the step of creating a histogram uses equal height histograms. In one embodiment, the step of selecting the best bin boundary uses the Gini splitting criterion. In another embodiment, the step of selecting the best bin boundary uses the information gain criterion. In one embodiment, the step of selecting the split point uses an interval that is centered around the best bin boundary. In another embodiment, the step of selecting the split point uses an interval that is biased towards the bin with a greater number of instances. In one embodiment, the step of combining multiple decision trees uses majority voting. In another embodiment, the step of combining multiple decision trees uses weighted voting.

This algorithm, and its variants, can be applied wherever classification algorithms such as decision trees are used in data mining. The algorithm, and its software implementation, can be used in many commercial areas, wherever there is need to improve the accuracy of classification with little added overhead. The data being analyzed using the classification algorithms can be either scientific or commercial. For example an insurance company can use it to decide if a person is a good risk, an astronomer can use it to classify an object as a star or galaxy, and a telephone company can use it to decide if a person is likely to change to a different vendor. It can also be used for targeting marketing, identifying bad widgets in an assembly line during quality control, and in various medical applications such as identification of cancerous cells in a mammogram, or identifying the best treatment for a patient.

The invention is susceptible to modifications and alternative forms. Specific embodiments are shown by way of example. It is to be understood that the invention is not limited to the particular forms disclosed. The invention covers all modifications, equivalents, and alternatives falling within the spirit and scope of the invention as defined by the claims.

BRIEF DESCRIPTION OF THE DRAWINGS

The accompanying drawings, which are incorporated into and constitute a part of the specification, illustrate specific embodiments of the invention and, together with the general description of the invention given above, and the detailed description of the specific embodiments, serve to explain the principles of the invention.

DETAILED DESCRIPTION OF THE INVENTION

Figure 1:
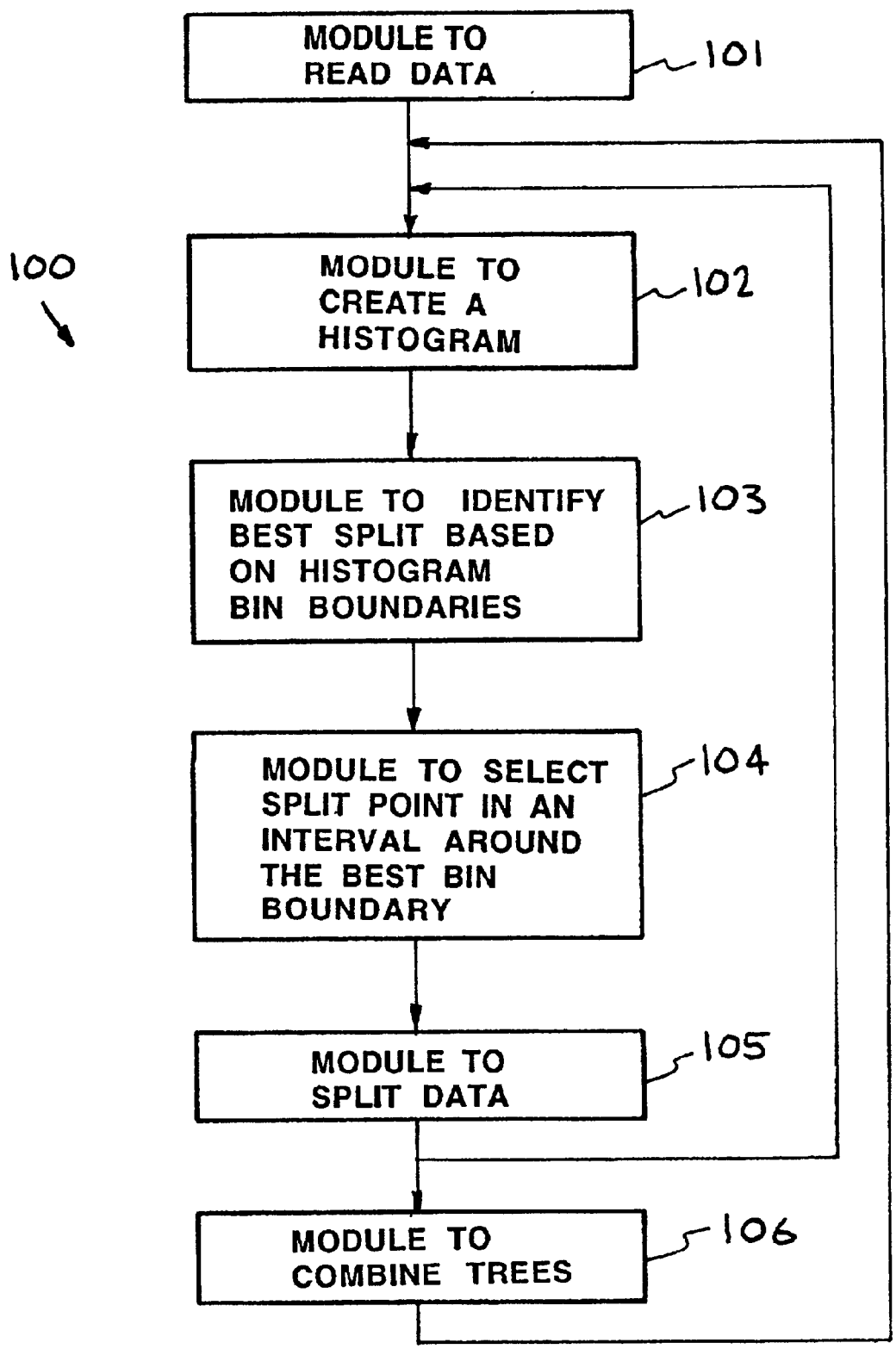
FIG. 1 is a flow chart illustrating modules included in one embodiment of a system incorporating the present invention.

Referring now to the drawings, to the following detailed information, and to incorporated materials; a detailed description of the invention, including specific embodiments, is presented. The detailed description serves to explain the principles of the invention. The invention is susceptible to modifications and alternative forms. The invention is not limited to the particular forms disclosed. The invention covers all modifications, equivalents, and alternatives falling within the spirit and scope of the invention as defined by the claims.

Decision trees are popular classification methods, and there are numerous algorithms to induce a decision tree classifier from a data set. Most tree inducing algorithms create tests at each node that involve a single attribute of the data. These tests are obtained by finding the best split for an attribute, across all attributes, using the instances of the data at each node of the decision tree. Once the test is obtained for a node, the instances are split according to the test, and the process repeated on each of the unresolved nodes.

Recent research has shown that it is possible to improve the accuracy of classifiers, such as decision trees, by creating more than one classifier and combing their results through a voting scheme. There are several ways in which these ensembles of decision trees can be created and their results combined. The present invention provides a new way of generating ensembles using decision tree classifiers. The present invention introduces randomization in the selection of the split point at each node of the tree. First, a histogram is created for each attribute, using the instances at the node of the tree. Next, the bin boundaries of the histograms are chosen as potential split points and evaluated based on a splitting criterion. An interval is selected around the best such bin boundary, and a split point selected randomly in this interval. Since the split point is selected randomly, this approach allows us to create decision trees that are different. The results of these trees can be combined using a voting scheme. The present invention can result in improved accuracy with relatively little overhead in building the ensemble of trees. In addition, the algorithm of the present invention also lends itself to parallelism.

The present invention provides a new way of creating ensembles of decision trees by using histograms and selecting a split point randomly in an interval around the best bin boundary. Previous approaches to creating ensembles have relied on sampling as a way of introducing randomization in each decision tree in the ensemble. Other approaches for creating single decision trees that have used histograms have done so with the intent of avoiding the expensive sorting of all the data that is needed at the beginning of the creation of each decision tree. Our approach also replaces this initial expensive sort by a cheaper histogram which has to be created at each node of the tree. However, our approach goes further, and introduces randomization by selecting the split point randomly in an interval near the best bin boundary of the histogram. In addition, since the same initial set of instances are used for all trees, the first histogram can be created only once for all the trees. Therefore, creating an ensemble of N trees with the new invention would take less time than N times the time to create a single tree.

In the present invention, the same initial set of instances is used to create each tree in the ensemble. What changes with each tree is the decision used to split the instances at a node. This means that the initial histogram that is required in the creation of each tree can be done only once for all trees in the ensemble (as the same initial set of instances is used). Therefore, the total time to create N trees is less than N times the time to create a single tree. The benefits of Applicants' approach include:

1) A parallel algorithm that can be competitive with other ensemble classifiers such as boosting on some datasets.

2) An algorithm that takes much less time than other algorithms for creating ensembles.

3) An algorithm that can create more accurate classifiers through the use of ensembles.

4) Referring now to the drawings and in particular to FIG. 1, a flow chart is provided that illustrates one embodiment a system incorporating the present invention. The system is designated generally by the reference numeral 100. The system 100 provides a new way of generating ensembles using decision tree classifiers. The system 100 selects a random split point in an interval around the best bin boundary of the histogram created using the instances available at each node of the tree. This split point is used to make the decision at that node. Since the split point selected at each node, each time a tree is created, is likely to be different, this approach allows us to create decision trees that are different. The results of these trees can be combined in ensembles using a voting scheme. Use of the system 100 can result in improved accuracy with relatively little overhead in building the ensemble of trees. In addition, the algorithm used in system 100 also lends itself to parallelism. The system 100 provides a new way of creating ensembles of decision trees by creating a histogram of the data at each node of the tree, and introducing randomization by selecting the split point near the best bin boundary of the histogram.

The following modules are included in flow chart: module to read data 101, module to create a histogram of the data 102, module to identify the best split based on histogram bin boundaries 103, module to select the split point in an interval around the best bin boundary 104, module to split the data 105, and module to combine multiple decision trees 106. It is to be understood that not all of the modules are used in individual embodiments of the invention. The embodiment 100 can be implemented on parallel computers.

The first module 101 reads the data from a file to main memory. Once the data is read into memory, it is used to create several decision trees. For each tree, the data is first used to create a histogram in the module 102. This creation of the initial histogram can be done separately for each tree. There are several different options that can be used to create the histogram. The histograms can be equal-width or equal-height histograms. The number of bins in the histogram could be determined in different ways either as a fixed number, or as a number varying with the number of instances at the node. Histograms could be used at all levels of the decision tree, or the traditional sorting approach used when the number of instances at a node is relatively small. Then, for each node of the decision tree, the best split is identified in module 103 in accordance with some splitting criterion. There are several options for this splitting criterion, such as Gini, Information Gain, etc. This is done using the histogram bin boundaries as potential splitting points. Then, in module 104, a split point is chosen randomly in an interval around the best bin boundary. This interval can be centered around the best bin boundary or biased according to the number of instances in the bins on either side of the best bin boundary. The width of the interval is chosen to be the same as the width of a bin, though other options are also possible. The data is then split in module 105. The modules of creating the histogram at a node, finding the best split at a node using the histogram bin boundaries, selecting a split point randomly in an interval around the best bin boundary, and splitting the data at a node is repeated for each unresolved node in the decision tree. The resulting decision trees are grouped by module 106 that combines multiple decision trees to create an ensemble.

Figure 2:
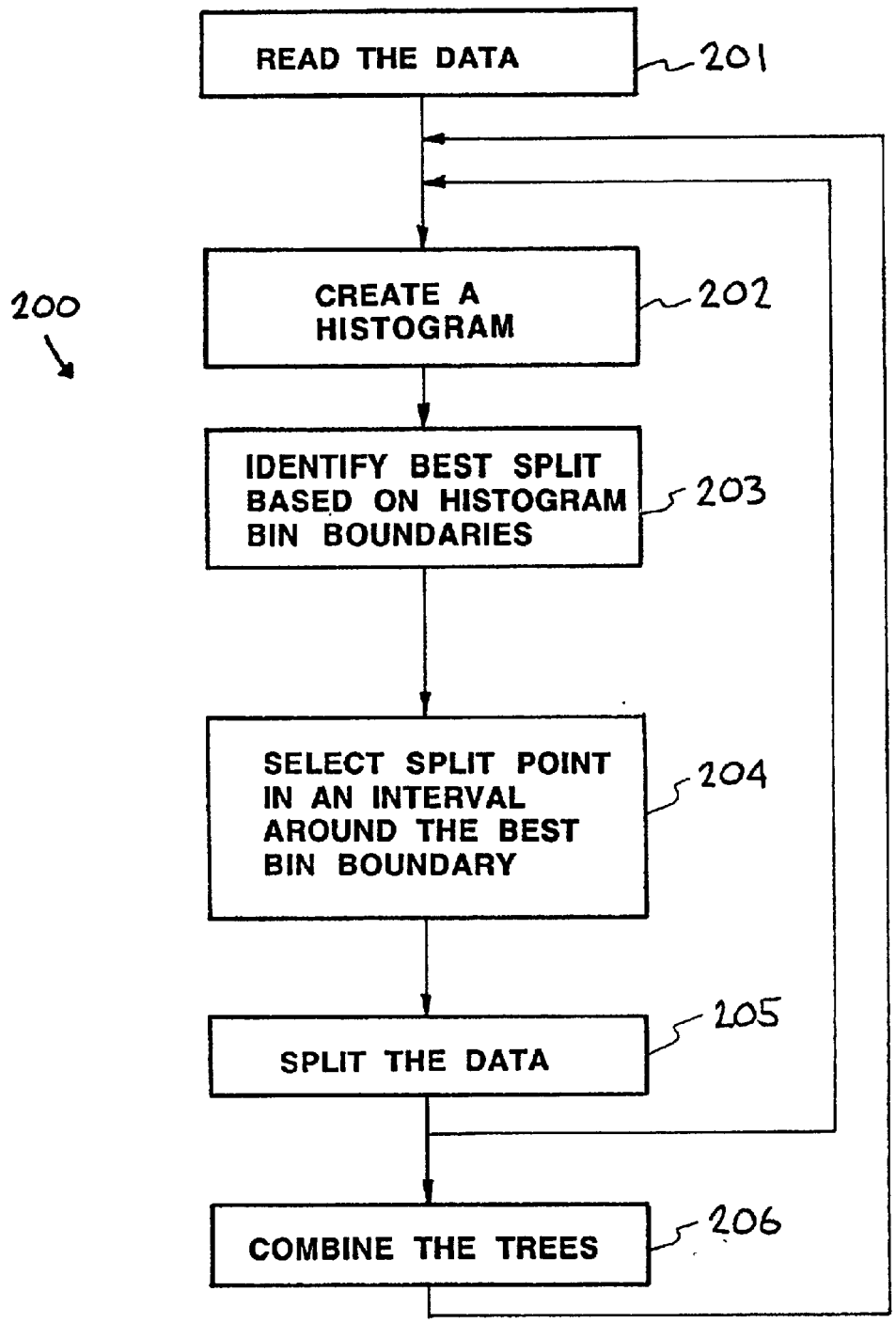
FIG. 2 is a flow chart illustrating the steps used in one embodiment of a system incorporating the present invention.

Referring now to FIG. 2, a flow chart is provided illustrating the steps used in one embodiment of a system incorporating the present invention. The system is designated generally by the reference numeral 200. The following steps are included in flow chart: step to read data 201, step to create a histogram of the data 202, step to identify the best split using the histogram bin boundaries 203, step to randomly select a split point in an interval around the best bin boundary 204, step to split the data 205, and step to combine multiple decision trees 206. It is to be understood that not all of the steps are used in individual embodiments of the invention. The embodiment 200 can be implemented on parallel computers.

The first step 201 reads the data from a file to main memory. Once the data is read into memory, it is used to create several decision trees. For each tree, the data is first used to create a histogram in step 202. This creation of the initial histogram can be done separately for each tree. There are several different options that can be used to create the histogram. The histograms can be equal-width or equal-height histograms. The number of bins in the histogram could be determined in different ways either as a fixed number, or as a number varying with the number of instances at the node. Histograms could be used at all levels of the decision tree, or the traditional sorting approach used when the number of instances at a node is relatively small. Then, for each node of the decision tree, the best split is identified in step 203 in accordance with some splitting criterion. There are several options for this splitting criterion, such as Gini, Information Gain, etc. This is done using the histogram bin boundaries as potential splitting points. Then, in step 204, a split point is chosen randomly in an interval around the best bin boundary. This interval can be centered around the best bin boundary or biased according to the number of instances in the bins on either side of the best bin boundary. The width of the interval is chosen to be the same as the width of a bin, though other options are also possible. The data is then split in step 205. The steps of creating the histogram at a node, finding the best split at a node using the histogram bin boundaries, selecting a split point randomly in an interval around the best bin boundary, and splitting the data at a node is repeated for each unresolved node in the decision tree. The resulting decision trees are grouped by step 206 that combines multiple decision trees to create an ensemble.

Figure 3:
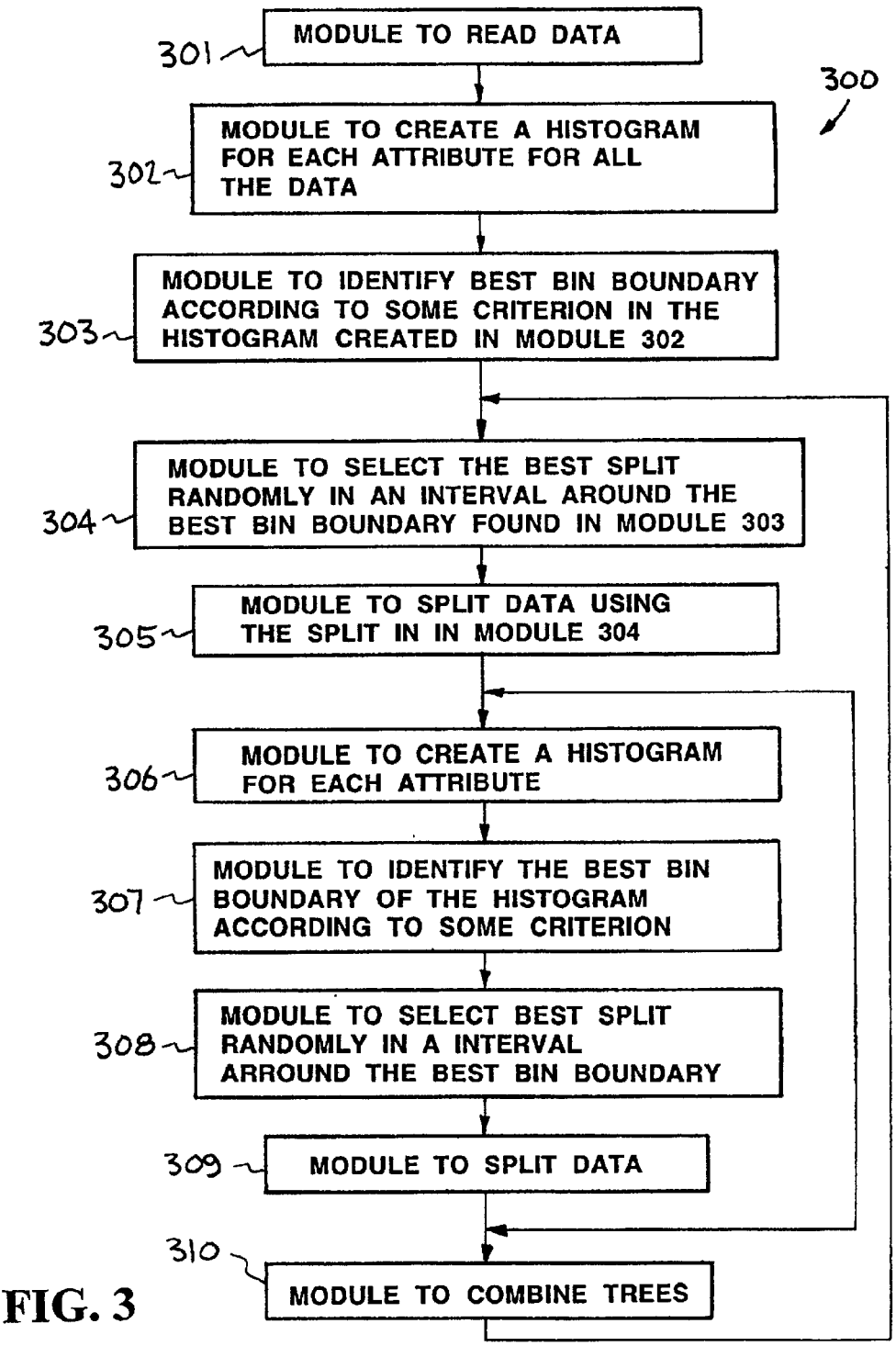
FIG. 3 is a flow chart illustrating modules included in another embodiment of a system incorporating the present invention.

Referring now to FIG. 3, a flow chart is provided illustrating various modules used in another embodiment of a system incorporating the present invention. In this embodiment, some of the modules common to the root node of all the trees are separated out so they are done only once. These modules include the creation of the initial histogram and the identification of the best bin boundary for this histogram according to some criterion. The system is designated generally by the reference numeral 300. The following modules are included in flow chart: module 301 to read data, module 302 to create a histogram at the root node of the tree for each attribute using all the data, module 303 to find the best bin boundary according to some criterion using the histogram from module 302, module 304 to select a split point randomly in an interval around the best bin boundary found in module 303, module 305 to split the data using the split in module 304, module 306 to create a histogram for each attribute using the data at a node, module 307 to identify the best bin boundary for the histogram according to some splitting criterion, module 308 to randomly select a split point in an interval around this best bin boundary, module 309 to split the data using the split point, and module 310 to combine multiple decision trees. It is to be understood that not all of the modules are used in individual embodiments of the invention. The embodiment 300 can be implemented on parallel computers.

The first module 301 reads the data from a file to main memory. Once the data is read into memory, it is used to create several decision trees. The creation of the initial histogram and the identification of the best bin boundary at the root level for all the trees is done only once in modules 302 and 303, respectively. There are several different options that can be used to create the histogram. The histograms can be equal-width or equal-height histograms. The number of bins in the histogram could be determined in different ways either as a fixed number, or as a number varying with the number of instances at the node. Histograms could be used at all levels of the decision tree, or the traditional sorting approach taken when the number of instances at a node is relatively small. There are also several options for the splitting criterion, such as Gini, Information Gain, etc. The histogram bin boundaries are used as potential splitting points. Once the best bin boundary at the root node of the tree has been found, then, for each tree in the ensemble, a split point is randomly selected in an interval around the best bin boundary in module 304. This interval can be centered around the best bin boundary or biased according to the number of instances in the bins on either side of the best bin boundary. The width of the interval is chosen to be the same as the width of a bin, though other options are also possible. The data at the root node of each tree is then split according to this split point in module 305. Since the split point at the root node of the tree is different for each tree (due to the random selection), the trees generated will be different. Once the split at the root node has been made, the process is repeated at each of the children nodes as follows. A histogram is created using the data at each node in module 306. The best bin boundary according to some criterion is identified in module 307. The split point is selected randomly in an interval around the best boundary in module 308. The instances at the node are split in module 309 using the split point. The modules of creating the histogram, identifying the best bin boundary, selecting the split point randomly in an interval around the best bin boundary, and splitting the data at a node is repeated for each unresolved node in the decision tree. The resulting decision trees are grouped by module 310 that combines multiple decision trees to create an ensemble.

Figure 4:
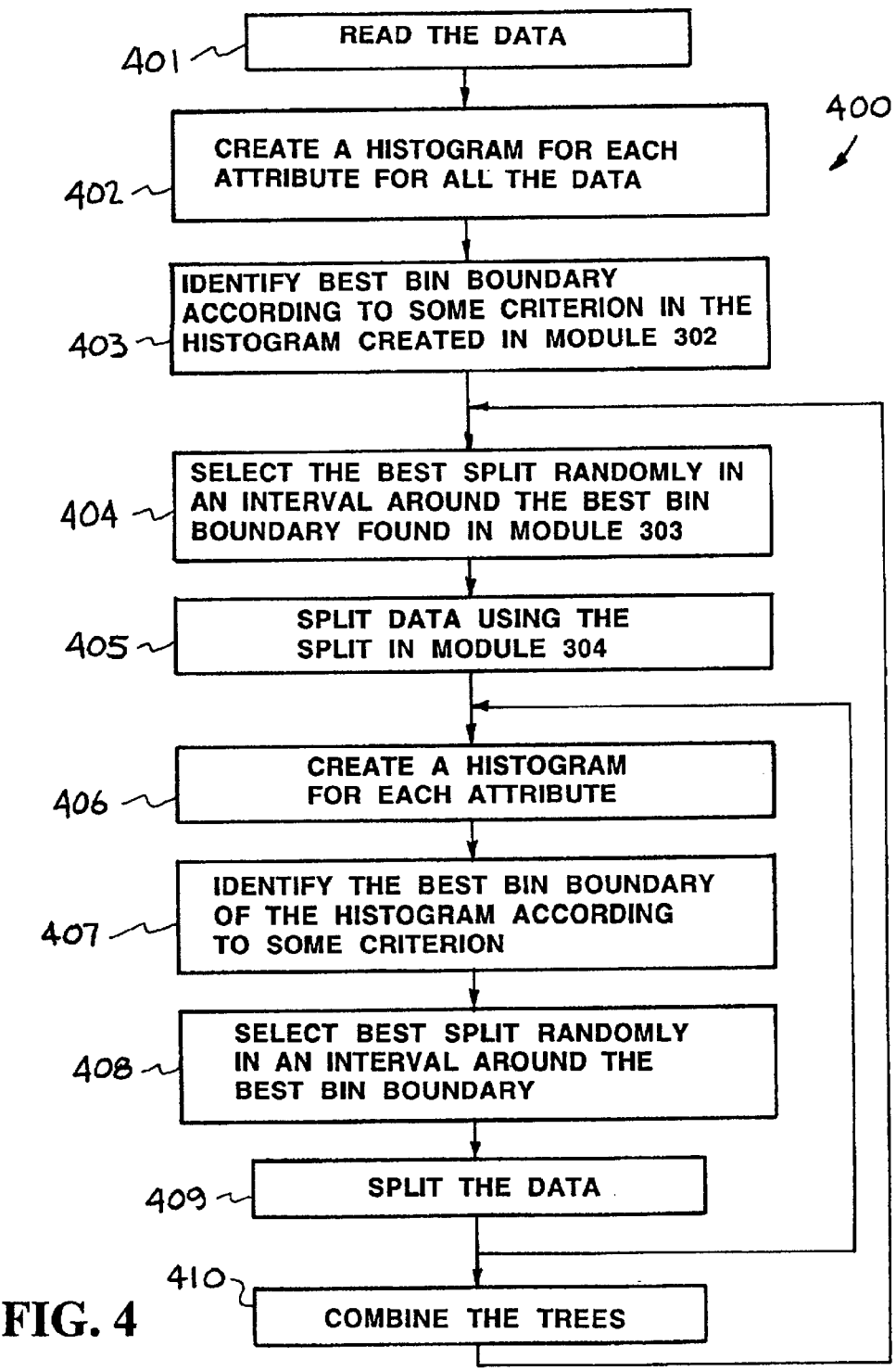
FIG. 4 is a flow chart illustrating the steps used in another embodiment of a system incorporating the present invention.

Referring now to FIG. 4, a flow chart is provided illustrating steps used in another embodiment of a system incorporating the present invention. In this embodiment, some of the steps common to the root node of all the trees are separated out so they are done only once. These steps include the creation of the initial histogram and the identification of the best bin boundary for this histogram according to some criterion. The system is designated generally by the reference numeral 400. The following steps are included in the flow chart: step 401 to read data, step 402 to create a histogram at the root node of the tree for each attribute using all the data, step 403 to find the best bin boundary according to some criterion using the histogram from step 402, step 404 to select a split point randomly in an interval around the best bin boundary found in step 403, step 405 to split the data using the split in step 404, step 406 to create a histogram for each attribute using the data at a node, step 407 to identify the best bin boundary for the histogram according to some criterion, step 408 to select randomly a split point in an interval around this best bin boundary, step 409 to split the data using the split point, and step 410 to combine multiple decision trees. It is to be understood that not all of the steps are used in individual embodiments of the invention. The embodiment 400 can be implemented on parallel computers.

The first step 401 reads the data from a file to main memory. Once the data is read into memory, it is used to create several decision trees. The creation of the histogram and the identification of the best bin boundary for all the trees at the root level is done only once in steps 402 and 403, respectively. There are several different options that can be used to create the histogram. The histograms can be equal-width or equal-height histograms. The number of bins in the histogram could be determined in different ways either as a fixed number, or as a number varying with the number of instances at the node. Histograms could be used at all levels of the decision tree, or the traditional sorting approach taken when the number of instances at a node is relatively small. There are also several options for the splitting criterion, such as Gini, Information Gain, etc. The histogram bin boundaries are used as potential splitting. Once the best bin boundary at the root node of the tree has been found, then, for each tree in the ensemble, a split point is randomly selected in an interval around the best bin boundary in step 404. This interval can be centered around the best bin boundary or biased according to the number of instances in the bins on either side of the best bin boundary. The width of the interval is chosen to be the same as the width of a bin, though other options are also possible. The data at the root node of each tree is then split according to this split point in step 405. Since the split point at the root node of the tree is different for each tree (due to the random selection), the trees generated will be different. Once the split at the root node has been made, the process is repeated at each of the children nodes as follows. A histogram is created using the data at each node in step 406. The best bin boundary according to some criterion is identified in step 407. The split point is selected randomly in an interval around the best boundary in step 408. The instances at the node are split in step 409 using the split point. The steps of creating the histogram, identifying the best bin boundary, selecting the split point randomly in an interval around the best bin boundary, and splitting the data at a node is repeated for each unresolved node in the decision tree. The resulting decision trees are grouped by step 410 that combines multiple decision trees to create an ensemble.

Experiments—To demonstrate the creation of ensembles of decision trees through the use of randomization via histograms at each node of the tree, several sets of experiments were conducted. These used public-domain data sets from the University of California, Irvine (UCI) repository. Five data sets were used; three of them were small and two were relatively large. For the small data sets, no separate test data was available to evaluate the performance of the new algorithms. In these cases, 10 runs of 10-fold cross validation were used. This involved dividing the data into 10 equal parts, and averaging the results obtained by taking, in turn, each of the parts as a test set, using the remaining 9 parts as the training set. This process was repeated 10 times, and the average of these 10 runs was obtained.

TABLE 1

Description of the public-domain data sets used in the experiments

| Data set | # Training (Test) instances | # classes | # discrete attributes | # continuous attributes |
|---|---|---|---|---|
| Breast cancer | 699 (–) | 2 | — | 9 |
| Pima diabetes | 768 (–) | 2 | — | 8 |
| German credit | 1000 (–) | 2 | 13 | 7 |
| Satellite image | 4435 (2000) | 6 | — | 36 |
| Letter recognition | 16000 (4000) | 26 | — | 16 |

For the first set of experiments, the focus was on a single decision tree instead of an ensemble of decision trees. The accuracy was obtained for two situations—the first was a single tree created using the traditional approach of sorting the instances at each node, and the second was a single tree created using histograms, with the best bin boundary chosen as the split point. In the case of the histogram tree, two options were tried—the first (a) used histograms regardless of the number of instances at a node, and the second (b) used histograms until the number of instances was less than the number of attributes, when the traditional sorting approach was used. Results were obtained with both un-pruned and pruned trees with pessimistic error pruning. The Gini splitting criterion was used for all data sets, except for the letter data set, where, in light of the large number of classes, the information gain criterion was used. Any other splitting criterion could also have been used. The histograms used were equal-width histograms, with the number of bins equal to the square-root of the number of instances at the node of the tree. Other more sophisticated ways of generating histograms are also possible. The test error percentages from the first set of experiments are summarized in Table 2. For the smaller data sets (Cancer, Diabetes, and Credit), the 10 runs of 10-fold cross validation result in both the test error and the standard error (given in parenthesis), while for the larger datasets with a separate test data, only the test error percentage is reported.

TABLE 2

Test error percentages (and standard error) for benchmark data sets for a single tree using sorting and histograms (approaches a and b), with and without pruning. The best entry in each column is in bold.

| Method | Cancer | Diabetes | Credit | Satellite | Letter |
|---|---|---|---|---|---|
| Tree w/ sorting | 5.97 | 29.27 | 32.10 | 15.85 | 27.35 |
| No pruning | (0.29) | (0.30) | (0.44) | | |
| Tree w/ sorting | 5.69 | 26.64 | 27.79 | 14.80 | 26.90 |
| Pruning | (0.16) | (0.49) | (0.23) | | |
| Tree w/ histogram | 5.22 | 28.41 | 29.56 | 15.70 | 16.37 |
| No pruning (a) | (0.17) | (0.24) | (0.16) | | |
| Tree w/ histogram | 5.00 | 24.53 | 27.37 | 15.20 | 16.27 |
| Pruning (a) | (0.18) | (0.37) | (0.27) | | |
| Tree w/ histogram | 5.16 | 28.38 | 29.40 | 15.75 | 16.42 |
| No pruning (b) | (0.17) | (0.24) | (0.17) | | |
| Tree w/ histogram | 5.01 | 24.71 | 27.33 | 15.20 | 16.38 |
| Pruning (b) | (0.18) | (0.37) | (0.26) | | |

The results in Table 2 indicate that pruning helps in some data sets (Diabetes and Credit) but does not significantly affect the accuracy in others. The two variants of the histogram-based tree, (a) and (b), do not differ significantly. In addition, the histogram-based tree, in spite of its approximate split (as it uses histograms instead of sorting) does not degrade the accuracy, but can even improve it in some cases (e.g., the Letter data set).

The second set of experiments focused on the performance of ensembles of trees created using the histogram approaches (a) and (b), with and without pruning. The results of the ensembles were combined using simple unweighted voting, though more complex voting schemes are possible. The results for this set of experiments are summarized in Table 3, which includes the test error percentages, with the standard error in parenthesis. The number of trees in the ensemble vary from 10 to 100. For the larger two data sets, Satellite and Letter, ensembles with only 10, 20, and 50 trees were created as it took too long to create ensembles with 100 trees. Also, the results with the smaller data sets indicated that increasing the number of trees in the ensemble beyond a certain point did not help reduce the test error percentages.

TABLE 3

Test error percentages, with standard error in parenthesis for the histogram-based approaches (a) and (b), with and without pruning. The best entry in each column is in bold.

| Method | # trees | Cancer | Diabetes | Credit | Satellite | Letter |
|---|---|---|---|---|---|---|
| Histogram | 10 | 4.73(0.17) | 25.50(0.31) | 28.95(0.18) | 13.70(0.13) | 12.03(0.24) |
| tree (a) | 20 | 4.53(0.13) | 24.96(0.18) | 29.19(0.31) | 13.41(0.12) | 11.96(0.16) |
| No pruning | 50 | 4.76(0.17) | 24.76(0.33) | 29.04(0.22) | 13.20(0.08) | 11.69(0.11) |
| | 100 | 4.56(0.15) | 24.04(0.18) | 29.62(0.18) | — | — |
| Histogram | 10 | 5.09(0.10) | 23.74(0.25) | 26.96(0.14) | 14.55(0.13) | 13.36(0.17) |
| tree (a) | 20 | 5.09(0.10) | 23.95(0.24) | 27.01(0.19) | 14.68(0.07) | 13.15(0.17) |

TABLE 3-continued

Test error percentages, with standard error in parenthesis for the histogram-based approaches (a) and (b), with and without pruning. The best entry in each column is in bold.

| Method | # trees | Cancer | Diabetes | Credit | Satellite | Letter |
|---|---|---|---|---|---|---|
| Pruning | 50 | 4.88(0.11) | 23.60(0.12) | 26.81(0.19) | 14.33(0.08) | 12.88(0.11) |
|  | 100 | 5.03(0.13) | 23.26(0.13) | 27.09(0.19) | — | — |
| Histogram | 10 | 4.62(0.16) | 25.57(0.28) | 25.66(0.44) | 13.72(0.12) | 11.94(0.24) |
| tree (b) | 20 | 4.51(0.13) | 25.05(0.16) | 29.10(0.33) | 13.27(0.07) | 11.79(0.16) |
| No pruning | 50 | 4.78(0.18) | 24.74(0.30) | 28.96(0.25) | 13.17(0.08) | 11.64(0.14) |
|  | 100 | 4.56(0.15) | 24.18(0.14) | 29.57(0.18) | — | — |
| Histogram | 10 | 5.01(0.18) | 23.66(0.27) | 27.33(0.26) | 14.56(0.11) | 13.22(0.24) |
| tree (b) | 20 | 5.06(0.13) | 23.66(0.22) | 27.00(0.19) | 14.65(0.06) | 12.97(0.14) |
| Pruning | 50 | 4.79(0.12) | 23.41(0.19) | 26.82(0.17) | 14.32(0.08) | 12.89(0.11) |
|  | 100 | 4.98(0.12) | 23.26(0.15) | 27.10(0.19) | — | — |

A comparison of Tables 2 and 3 indicates that the use of randomization through histograms in ensembles of decision trees improves the accuracy of the classifier, in comparison to a single tree created in the traditional method using sorting. The improvement obtained is dependent on the data set. For example, comparing the best result in the corresponding columns of Tables 2 and 3, the use of ensembles reduces the error rate for the Cancer data set from 5.00 to 4.51, and for the Letter data set from 16.27 to 11.64. The results also indicate that the two different approaches to using histograms do not differ substantially in accuracy. Further, pruning helps in some cases, but not in others.

The third set of experiments combined the use of histograms with another technique proposed by the inventors that is based on sampling. This technique is summarized in the paper, "Creating Ensembles of Decision Trees Through Sampling," by Chandrika Kamath and Erick Cantu-Paz, presented at the 33-rd Symposium on the Interface: Computing Science and Statistics, Costa Mesa, Jun. 13–16, 2001. In this approach, randomization is introduced in the decision tree by considering a sample of the instances at a node to determine the split at that node. Combining this with the histogram approach works as follows. First, for each attribute, a sample of the instances at a node is obtained. Next, the histogram is created using this sample, and the best bin boundary found for this attribute. The process is repeated across all the attributes. The best bin boundary across all the attributes is found and the split point is randomly selected in an interval around it. Thus randomization is introduced both through the sampling and the random selection of the split point in an interval around the best bin boundary.

Table 4 presents the test error percentages, with standard error in parenthesis, for the two larger data sets for the combined sampling and histogram approach to generating ensembles. The results are the percentage error on the test set, averaged over 10 runs. Only approach (a) is used for the histograms as prior experiments suggested that there is not a significant difference between approaches (a) and (b). At each node of a decision tree, 10% of the instances are selected, unless the number of instances is less than twice the number of attributes, in which case, no sampling is done. The results indicate that for the combined method using both sampling and histograms, the test error rate can be reduced further than by using histograms alone.

TABLE 4

Test error percentages, with standard error in parenthesis, for the combined method using both sampling and histograms. Results are the average of 10 runs. The best result in each column is highlighted in bold.

| Method | # trees | Satellite | Letter |
|---|---|---|---|
| Histogram tree (a) | 10 | 11.18 (0.12) | 7.85 (0.11) |
| No Pruning | 20 | 13.41 (0.12) | 6.81 (0.06) |
|  | 50 | 10.21 (0.08) | 6.31 (0.04) |
| Histogram tree (a) | 10 | 12.16 (0.17) | 9.25 (0.13) |
| With pruning | 20 | 11.75 (0.07) | 8.20 (0.08) |
|  | 50 | 11.55 (0.08) | 7.72 (0.06) |

For comparison, the test error percentage, with standard error in parenthesis for the competitive methods of generating ensembles (AdaBoost, Bagging, and ArcX4) are given in Table 5. All results are with pruning, averaged across 10 runs. As before, for the smaller data sets, 10-fold cross validation was used, while for the larger data sets, the separate test set was used. These results indicate that the proposed approach using histograms and randomization is competitive in comparison to traditional ensemble-based techniques such as AdaBoost, Bagging, and ArcX4.

TABLE 5

Test error percentage, with standard error in parenthesis, for competitive techniques for creating ensembles. Standard error is omitted in the cases where there is no randomization and the results of the 10 runs are the same. The best result for each column is highlighted in bold.

| Method | # tre | Cancer | Diabetes | Credit | Satellite | Letter |
|---|---|---|---|---|---|---|
| AdaBoost | 10 | 4.69 (0.18) | 25.26 (0.47) | 26.20 (0.31) | 12.65 | 22.55 |
|  | 20 | 4.69 (0.18) | 24.50 (0.37) | 26.03 (0.50) | 12.65 | 22.55 |
|  | 50 | 4.69 (0.18) | 24.50 (0.37) | 25.81(0.53) | 12.65 | 22.55 |
| Bagging | 10 | 3.59 (0.11) | 24.50 (0.32) | 26.60 (0.19) | 12.91 (0.13) | 14.71 (0.36) |
|  | 20 | 3.66 (0.09) | 23.30(0.25) | 26.00 (0.31) | 12.34 (0.12) | 12.45 (0.19) |
|  | 50 | 3.37(0.08) | 23.79 (0.19) | 26.21 (0.18) | 11.99 (0.10) | 11.18 (0.08) |

TABLE 5-continued

Test error percentage, with standard error in parenthesis, for
competitive techniques for creating ensembles. Standard error is
omitted in the cases where there is no randomization and the results
of the 10 runs are the same. The best result for each column is
highlighted in bold.

| Method | # tre | Cancer | Diabetes | Credit | Satellite | Letter |
|---|---|---|---|---|---|---|
| ArcX4 | 10 | 3.96 (0.08) | 25.77 (0.44) | 27.92 (0.23) | 11.75 | 17.60 |
| | 20 | 3.87 (0.11) | 26.05 (0.40) | 27.86 (0.22) | 11.05 | 15.50 |
| | 50 | 3.87 (0.20) | 26.32 (0.36) | 28.34 (0.26) | 10.70 | 11.65 |

Since the new techniques use histograms instead of sorting, and evaluate fewer split points (only at the bin boundaries instead of between every two consecutive attribute values), it is expected that they will be faster than existing ensemble techniques. However, some of this reduction in time is offset by the fact that the histograms have to be created at each node, while the initial sorting can be done only once for the entire tree. The timing results comparing 10 runs of the new algorithm with competitive approaches are presented in Table 7. These timings were obtained on a 1.5 GHz Pentium III system with 512 MB of memory. Only the larger two data sets were considered in this experiment. For the histogram approach, each tree creates its own histogram at the root node; the timing results are thus higher than if the method had been optimized to incorporate the simplification in the embodiment of FIGS. 3 and 4. Each classifier is created with pessimistic error pruning. The time taken for a single tree, using the traditional sorting approach is 71 seconds for the Satellite data set and 585 seconds for the Letter data set. The results in Table 7 show that for the histogram-based approach, the time taken to create N trees is much less than N times the time taken to create a single tree, and less than the time taken by competitive methods. These results indicate that the new technique can be very effective, not only in improving the accuracy, but also in reducing the time taken to create the ensemble.

TABLE 7

Timing results in seconds for 10 runs of different ensemble techniques

| Data set | # trees | AdaBoost | Bagging | ArcX4 | Histogram |
|---|---|---|---|---|---|
| Satellite | 10 | 405 | 568 | 500 | 304 |
| | 20 | 405 | 1134 | 1025 | 609 |
| | 50 | 400 | 2892 | 2715 | 1522 |
| Letter | 10 | 4245 | 4785 | 6475 | 714 |
| | 20 | 4250 | 9590 | 13190 | 1442 |
| | 50 | 4255 | 25528 | 35730 | 5346 |

This algorithm, and its variants, can be applied wherever classification algorithms such as decision trees are used in data mining. The algorithm, and its software implementation, can be used in many commercial areas, wherever there is need to improve the accuracy of classification with little added overhead. The data being analyzed using the classification algorithms can be either scientific or commercial. For example an insurance company can use it to decide if a person is a good risk, an astronomer can use it to classify an object as a star or galaxy, and a telephone company can use it to decide if a person is likely to change to a different vendor. It can also be used for targeting marketing, identifying bad widgets in an assembly line during quality control, and in various medical applications such as identification of cancerous cells in a mammogram, or identifying the best treatment for a patient.

This invention has been applied to the practical problem of finding radio-emitting galaxies with a bent-double morphology. Details are summarized in the paper "Classification of Bent-Double Galaxies: Experiences with Ensembles of Decision Trees," by Chandrika Kamath and Erick Cantu-Paz, presented at the Fifth Workshop on Mining Scientific and Engineering Data sets, held in conjunction with the second SIAM International Conference on Data Mining, Apr. 13, 2002.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

What is claimed is:

1. A decision tree system, comprising:
   a module to read the data,
   a module to create a histogram of the data,
   a module to evaluate a potential split of the data according to some criterion, using said histogram,
   a module to select a split point randomly in an interval around the best split found using said histogram,
   a module to split the data, and
   a module to combine multiple decision trees in ensembles.

2. The decision tree system of claim 1 including a file and a main memory, wherein said module to read the data reads the data from said file to said main memory.

3. The decision tree system of claim 1 wherein said module to read the data creates multiple decision trees.

4. The decision tree system of claim 1 wherein there are the N trees in an ensemble in said module to combine multiple decision trees in ensembles, and wherein said module to create a histogram of the data creates said histogram at the root node of the tree and does so N times for each of the N trees in the ensemble.

5. The decision tree system of claim 1 wherein there are the N trees in an ensemble in said module to combine multiple decision trees in ensembles, and wherein the said module to create a histogram of the data at the root node of the tree, does so once for the N trees in the ensemble.

6. The decision tree system of claim 1 wherein said module to create a histogram of the data uses equal-width histograms.

7. The decision tree system of claim 1 wherein said module to create a histogram of the data uses equal-height histograms.

8. The decision tree system of claim 1 wherein said module to create a histogram of the data uses a fixed number of bins.

9. The decision tree system of claim 1 wherein said module to create a histogram of the data varies the number of bins with the number of the instances.

10. The decision tree system of claim 1, wherein in said module to evaluate a potential split of the data according to some criterion, the criterion to evaluate a potential split of the data is an information gain criterion.

11. The decision tree system of claim 1, wherein in said module to evaluate a potential split of the data according to some criterion, the criterion to evaluate a potential split of the data is a gini criterion.

12. The decision tree system of claim 1, wherein in said module to evaluate a potential split of the data according to some criterion, the criterion to evaluate a potential split of the data is an information gain ratio criterion.

13. The decision tree system of claim 1, wherein in said module to evaluate a potential split of the data according to some criterion, the criterion to evaluate a potential split of the data is a Twoing rule.

14. The decision tree system of claim 1, wherein the said module to combine multiple trees in ensembles uses plurality, "majority," voting.

15. The decision tree system of claim 1, wherein the said module to combine multiple trees in ensembles uses weighted voting, where different weights are given to the output from each tree.

16. A decision tree system, comprising:
means to read the data,
means to create a histogram of the data,
means to evaluate a potential split of the data according to some criterion, using the histogram,
means to select a split point randomly in an interval around the best split found using the histogram,
means to split the data, and
means to combine multiple decision trees in ensembles.

17. The decision tree system of claim 16 including a file and a main memory, wherein said means to read the data, reads the data from said file to said main memory.

18. The decision tree system of claim 16 wherein said means to read the data creates multiple decision trees.

19. The decision tree system of claim 16 wherein there are N trees in an ensemble in said means to combine multiple decision trees in ensembles and wherein said means to create a histogram of the data creates said histogram at the root node of said tree, does so N times for each of the N trees in the ensemble.

20. The decision tree system of claim 16 wherein there are N trees in an ensemble in said means to combine multiple decision trees in ensembles and wherein said means to create the histogram of the data at the root node of the tree, does so once for the N trees in the ensemble.

21. The decision tree system of claim 16 wherein said means to create a histogram of the data uses equal-width histograms.

22. The decision tree system of claim 16 wherein said means to create a histogram of the data uses equal-height histograms.

23. The decision tree system of claim 16 wherein said means to create a histogram of the data uses a fixed number of bins.

24. The decision tree system of claim 16 wherein said means to create a histogram of the data varies the number of bins with the number of the instances.

25. The decision tree system of claim 16, wherein said means to evaluate a potential split of the data uses an information gain criterion.

26. The decision tree system of claim 16, wherein said means to evaluate a potential split of the data uses a gini criterion.

27. The decision tree system of claim 16, wherein said means to evaluate a potential split of the data uses an information gain ratio criterion.

28. The decision tree system of claim 16, wherein said means to evaluate a potential split of the data uses a Twoing rule.

29. The decision tree system of claim 16, wherein the said means to combine multiple trees in ensembles uses plurality, "majority," voting.

30. The decision tree system of claim 16, wherein said means to combine multiple trees in ensembles uses weighted voting, where different weights are given to the output from each tree.

31. A decision tree system, comprising the steps of:
reading the data,
creating a histogram of said data,
evaluating a potential split of said data according to some criterion, using said histogram,
selecting a split point randomly in an interval around the best split found using said histogram,
splitting said data, and
combining multiple decision trees in ensembles.

32. The decision tree system of claim 31 including a file and a main memory, wherein said step of reading the data reads said data from said file to said main memory.

33. The decision tree system of claim 31 wherein said step of reading the data creates multiple decision trees.

34. The decision tree system of claim 1 wherein the said step of creating a histogram of said data, creates said histogram at the root node of said tree, does so N times for each of the N trees in said ensemble.

35. The decision tree system of claim 31 wherein the said step of creating a histogram of said data, creates said histogram at the root node of said tree, does so once for the N trees in the ensemble.

36. The decision tree system of claim 31 wherein said step of creating a histogram of said data uses equal-width histograms.

37. The decision tree system of claim 31 wherein said step of creating a histogram of said data uses equal-height histograms.

38. The decision tree system of claim 31 wherein said step of creating a histogram of said data uses a fixed number of bins.

39. The decision tree system of claim 31 wherein said step of creating a histogram of said data varies the number of bins with the number of the instances.

40. The decision tree system of claim 31, wherein said step of evaluating a potential split of said data according to some criterion uses an information gain criterion.

41. The decision tree system of claim 31, wherein said step of evaluating a potential split of said data according to some criterion uses a gini criterion.

42. The decision tree system of claim 31, wherein said step of evaluating a potential split of said data according to some criterion uses an information gain ratio criterion.

43. The decision tree system of claim 31, wherein said step of evaluating a potential split of said data according to some criterion uses a Twoing rule.

44. The decision tree system of claim 31, wherein said step of combining multiple trees in ensembles uses plurality, "majority," voting.

45. The decision tree system of claim 31, wherein said step of combining multiple trees in ensembles uses weighted voting, where different weights are given to the output from each tree.

* * * * *